Nov. 28, 1961  R. E. BOYDEN ET AL  3,010,647
MERCHANDISE REGISTERING APPARATUS
Filed Dec. 5, 1955  11 Sheets-Sheet 1

FIG.1

INVENTORS,
Robert E. Boyden
BY Fred N. Schwend

ATTORNEY.

INVENTORS,
Robert E. Boyden
Fred N. Schuend
BY
*Fred N. Schwend*
ATTORNEY.

Nov. 28, 1961 R. E. BOYDEN ET AL 3,010,647
MERCHANDISE REGISTERING APPARATUS
Filed Dec. 5, 1955 11 Sheets-Sheet 8

INVENTORS,
Robert E. Boyden
BY Fred N. Schwend

Fred N. Schwend
ATTORNEY.

Nov. 28, 1961   R. E. BOYDEN ET AL   3,010,647
MERCHANDISE REGISTERING APPARATUS
Filed Dec. 5, 1955   11 Sheets-Sheet 9

FIG. 21

INVENTORS,
Robert E. Boyden
Fred N. Schend
BY
ATTORNEY.

Nov. 28, 1961   R. E. BOYDEN ET AL   3,010,647
MERCHANDISE REGISTERING APPARATUS
Filed Dec. 5, 1955   11 Sheets-Sheet 10

FIG.22

INVENTORS,
Robert E. Boyden
Fred N. Schend
BY
*Fred N. Schend*
ATTORNEY.

3,010,647
MERCHANDISE REGISTERING APPARATUS
Robert E. Boyden, San Gabriel, and Fred N. Schwend, El Monte, Calif., assignors to Clary Corporation, San Gabriel, Calif., a corporation of California
Filed Dec. 5, 1955, Ser. No. 550,940
8 Claims. (Cl. 235—60.13)

This invention relates to business machines and has particular reference to a machine for aiding and recording sales transactions.

Heretofore, department stores and the like have utilized cash registers for keeping a record of the amount of money involved in sales transactions. The clerk identification number, department number and other identification matter was also entered into the cash register and recorded on a printed record. The sales person also generally recorded, in more detail, data pertaining to each sale, such as the class of mechandise, number of items sold, department number, etc., in a sales book or sales record.

A receipt was printed by the cash register and given to the customer. Later, the cash register records and the sales book entries were forwarded to an accounting department where the records were correlated and/or processed to compile statistics for inventory control, payroll, taxes and other purposes. Also, statements were prepared from the sales book entries, in the case of charge transactions.

The above procedure, although generally satisfactory, required considerable duplication of work in entering data in the cash register and also in the sales book entries. Also, the correlation of the various records and the additional handling of the same by the accounting department further increased the amount of clerical work and tended to introduce errors.

A principal object of the present invention is to provide an apparatus for concomitantly providing a customer's receipt and complete record of a sales transaction useful for accounting procedure and for preparing customers' statements.

Another object is to reduce the duplication of work on the part of a sales person and/or cashier in recording a sales transaction.

Another object is to reduce the possibility of errors in recording records of sales transactions.

Another object is to reduce the amount of manual figuring and book work in making a sales transaction.

Another object is to reduce the average time necessary for sales personnel and customers to make sales transactions.

Another object is to reduce errors in accounting procedure incident to sales transactions.

Another object is to provide a business machine which is selectively operable as a sales transaction machine and as an adding machine.

The manner in which the above and other objects of the invention are accomplished will be readily understood on reference to the following specification when read in conjunction with the accompanying drawings, wherein.

The sales transaction machine embodies certain mechanism which is basically similar to that found in the well-known Clary adding machine and reference is therefore made to the R. E. Boyden Patent No. 2,583,810 issued on January 29, 1952, and the E. P. Drake Patent No. 2,472,696 issued on June 7, 1949, for details of the basic Clary adding machine. Therefore, only those portions of such mechanism which relate to, or form part of, the present machine will be described in detail herein.

The machine is of the full keyboard type and comprises four rows of denominationally arranged differential actuator racks 11 (FIG. 2), each controlled by a row of nine amount keys 40.

A plurality of like racks are controlled by keys similar to the amount keys but are not associated with an accumulator. However, the latter racks are associated with a printer section.

For this purpose the keyboard is arranged in two sections, the right hand section 12 including the four rows of amount keys is provided to enter the amount of a salves transaction and arrange progressively in digital value from one to nine. The left hand section of the keyboard is provided to enter various identification data pertaining to such sales transactions. The two left hand rows of keys 13 are nominally employed to enter the department identification number although, under certain circumstances as will be described later, a portion of a customer's identification number may also be entered into these rows. The key row 14, lettered from A to J, is nominally the clerk identification row. The group 15, comprising two key rows, is nominally used to enter a code indicating the class of merchandise, and the remain- row 16 is nominally used to enter a code representing the type of transaction, i.e. cash, charge, C.O.D., etc.

In initiating operation of the machine to record a sales transaction, the clerk row 14 and transaction row 16 are enforced (see FIGS. 12 and 13), requiring depression of a key in each of said rows before the machine can be operated as a sales transaction machine. Thereafter, in entering data pertaining to the various items included in a sales transaction, depression of a key in either one or the other or both of the rows 17 and 16 is enforced (see FIGS. 3 and 4).

Describing first the general operation of the machine in effecting a sales transaction, the department, clerk and transaction code numbers are first set up on the appropriate rows or groups of rows 13, 14 and 16, respectively. Thereafter, a form print bar 18 is depressed, causing operation of the machine to actuate a form printer mechanism, generally indicated at 20, FIGS. 1, 5, 6 and 7, to print a sales receipt heading 21 (FIG. 19) on a paper tape 22 which is fed through the machine from a suitable supply roll (not shown).

Figures 16, 17, 18, 19, 20:
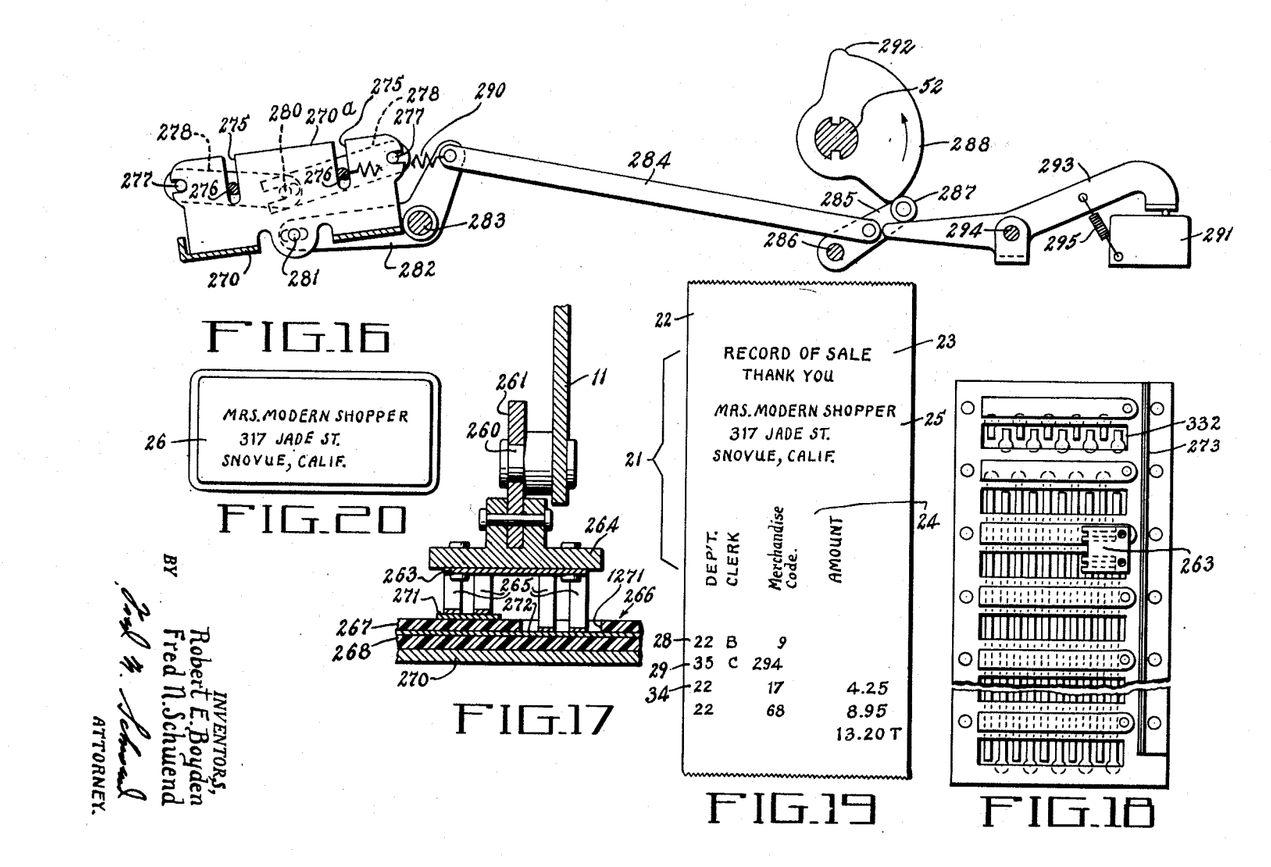
FIG. 16 is a sectional view illustrating the mechanism for positioning the contact plate assembly.
FIG. 17 is a transverse sectional view taken along the line 17—17 of FIG. 2 illustrating the connection between the auxiliary rack brushes and the contact plate assembly.
FIG. 18 is a plan view illustrating the contact plate assembly and is taken substantially along the line 18—18 of FIG. 2.
FIG. 19 is a front view of the specimen tape produced by the sales transaction machine.
FIG. 20 is a plan view of part of the customer token support slide illustrating a customer token supported thereby.

The heading 21 includes a suitable title 23 which may include the store name (not shown) and a set of column identifying titles 24.

If a transaction is to be of the "charge" type, an imprint 25 of the customer's charge token 26 (FIG. 20) is normally made during the form print operation, thus identifying the customer by named and address. The token 26 may be of any suitable well-known construction having the customer address, name, etc., embossed thereon. Such a token is disclosed, for example, in the patent to Dugdale No. 1,801,593 issued on April 21, 1931.

Figures 2, 3, 4:
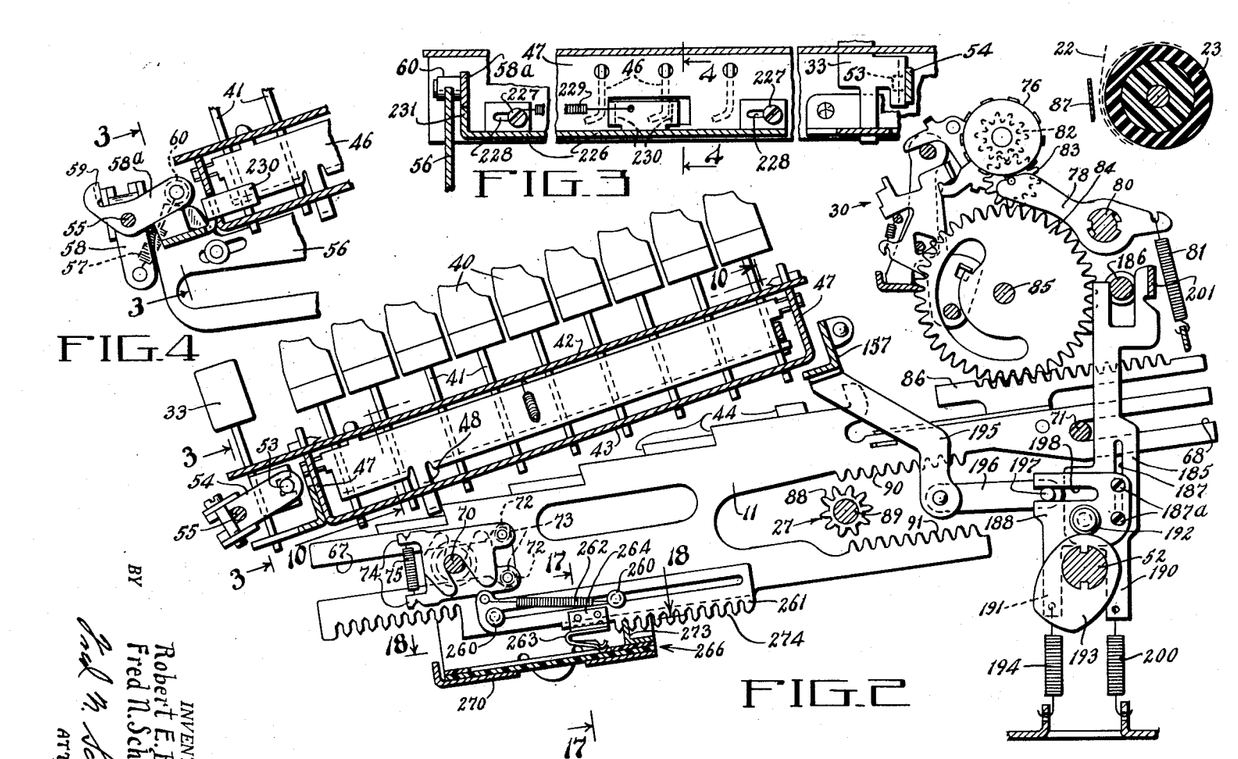
FIG. 2 is a longitudinal sectional view through the machine and is taken along the line 2—2 of FIG. 1.
FIG. 3 is a transverse sectional view of the forward portion of the keyboard illustrating part of the enforced designation mechanism, and is taken along the line 3—3 of FIG. 2 and of FIG. 4.
FIG. 4 is a longitudinal sectional view through the forward portion of the keyboard and is taken along the line 4—4 of FIG. 3.
Figure 5:
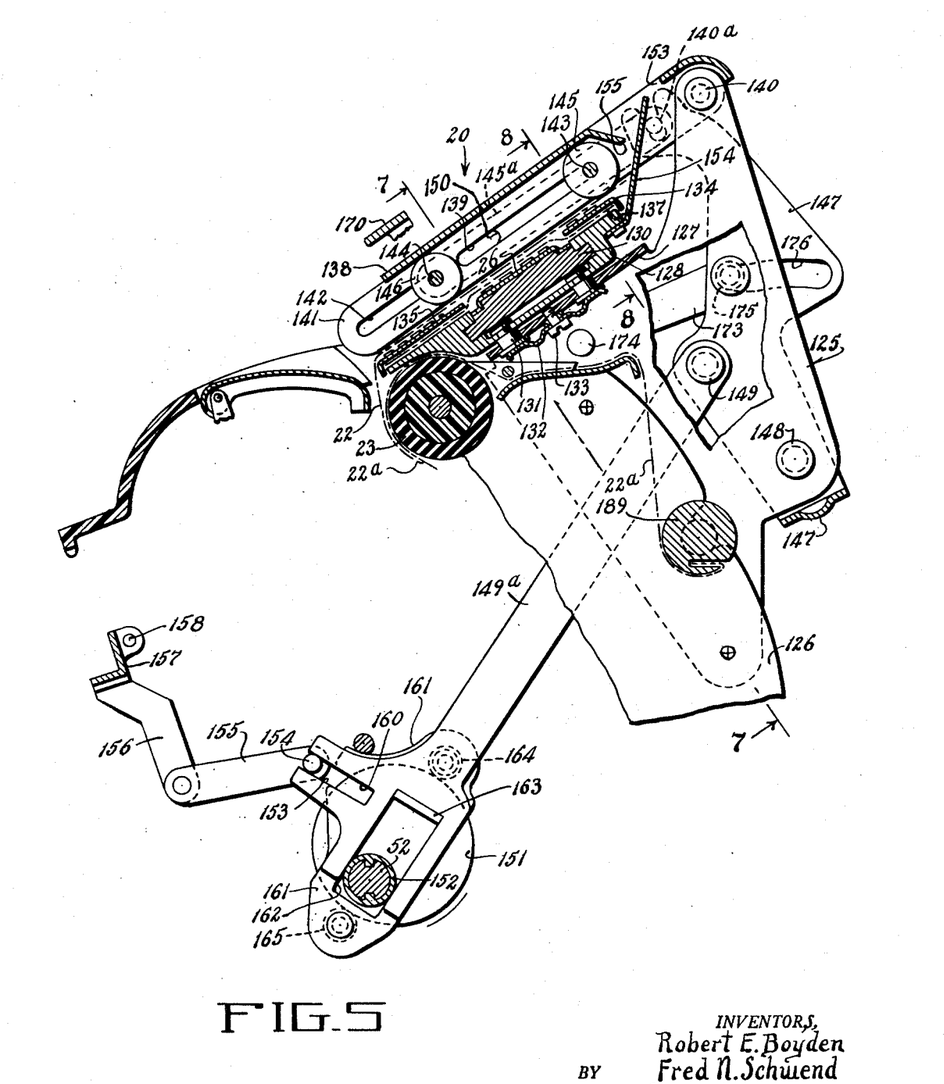
FIG. 5 is a longitudinal sectional view illustrating the form printer and is taken along the line 5—5 of FIG. 1.
Figure 6:
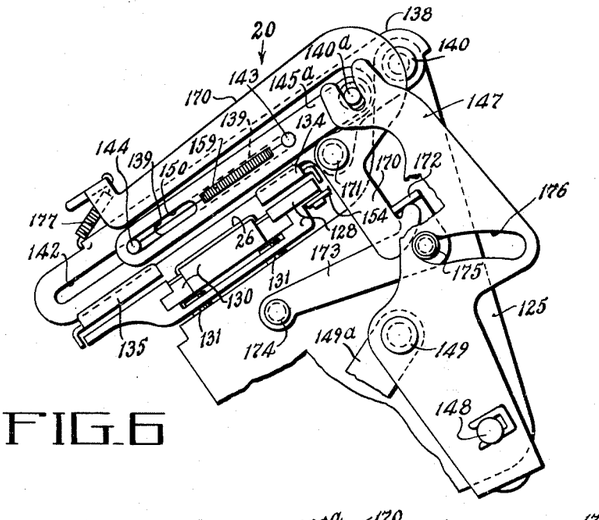
FIG. 6 is a side view, with parts broken away, illustrating the form printer.
Figure 22:
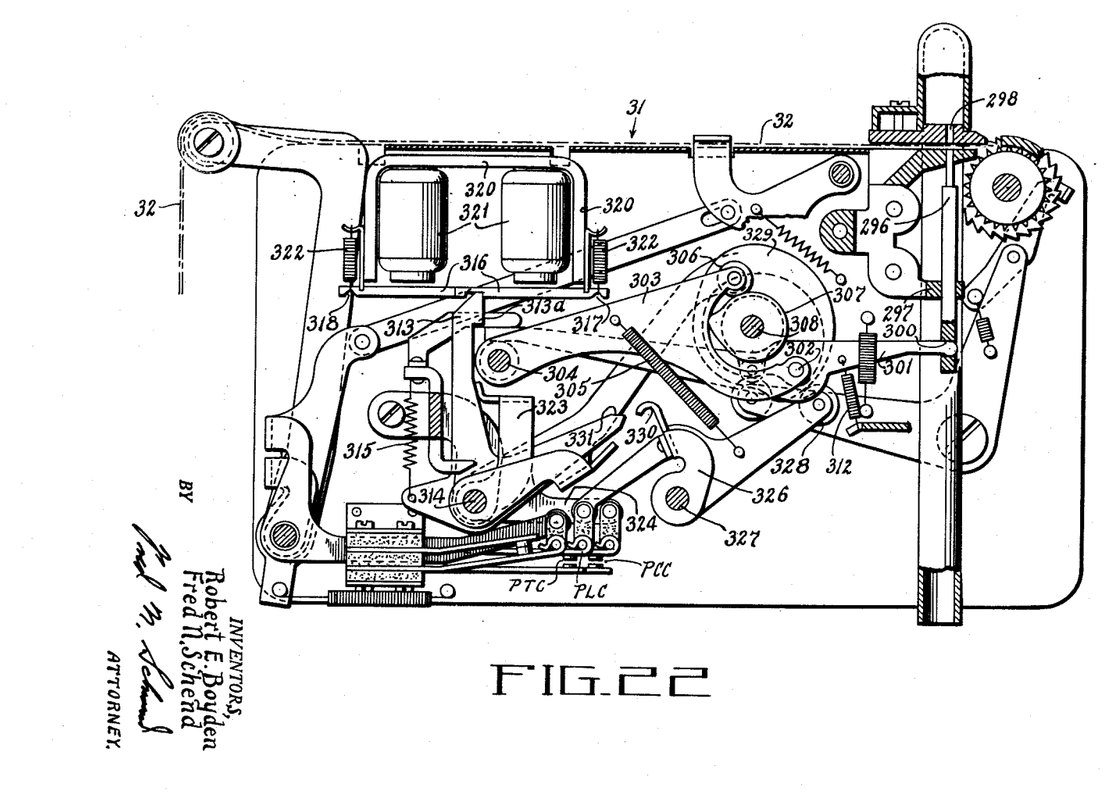
FIG. 22 is a sectional view through a typical tape punch device associated with the present invention.

During the form print operation, the accumulator generally indicated at 27 (FIG. 2) and operatively associated with the amount racks 11, is cleared to zero and the first line 28 indicating the department number and type of transaction is printed by an amount printer generally indicated at 30, FIG. 2. However, at this time any amount totaled from the accumulator, i.e., the amount normally registered on the printer section associated with the group of keys 12, is not printed. Further, a tape punch unit generally indicated at 31 (FIG. 22) is enabled so as to subsequently record in coded form the data pertaining to the various items entered into the machine through the keyboard and included in the sales transaction. In the event that the transaction is of the "charge" type, the customer's credit number is set up in the left hand section of the keyboard and entered in the machine, the same being printed on line 29 of the paper tape 22 and punched in a code tape 32 (FIG. 22).

Thereafter, the data pertaining to each of the items being sold in the transaction is recorded. Such data, including the department number, the merchandise code and value of each item, is entered into the keyboard and an add bar, i.e. 33 depressed, causing operation of the machine to print the same, as indicated at 34, FIG. 19, to accumulate the values thereof in the accumulator 27 and to cause the punch 31 to record the same on the code tape 32.

After all items of the transaction have been entered, including any tax, a total bar 35 is depressed, causing operation of the machine to take a total from the accumulator 27 and to print the same at 36 on the tape 22, also causing the punch 31 to record this total on the tape 32. As an incident to such totaling operation, the punch 31 is disabled, so that the machine may, if desired, be subsequently operated as a regular adding machine in which the form printing mechanism as well as the punch is not operated.

In the event of an erroneous entry of any data in the machine, an error key 101 is depressed which clears the accumulator and causes the punch 31 to record in code, an indication that the data recorded thereby subsequent to the preceding form print operation is in error. This, then requires a new form print operation and reentry of the items constituting the sales transaction.

Each of the rack control keys, i.e. like 40, of the keyboard comprises a key stem 41 (FIGS. 2, 4, 12 and 13) guided for vertical movement in aligned slots formed in plates 42 and 43, the latter plates forming a keyboard frame supported by the frame of the machine. The lower edges of the key stems cooperate with spaced shoulders 44 formed on the aligned racks 11 to limit the forward advancement of each rack to a number of increments corresponding to the value of the key depressed in the associated row.

Spring means (not shown) are provided for normally holding the various keys in their illustrated raised positions, and means are further provided for latching any key in rack arresting position upon depression thereof. For this purpose, each key has a cam lobe 45 (FIG. 13) thereon engageable with a locking bail 46, there being a bail located in each row. Each bail 46 is pivoted at its opposite ends to front and rear upstanding walls 47 of the bottom keyplate 43. As a key is depressed, it will rock its associated lock bail 46 outwardly, and, as a lobe 45 passes below the bail, the latter will be retracted partially by a suitable spring (not shown) to a position wherein it latches the key in a rack arresting position.

A zero block 48 (FIG. 2) depends from each lock bail 46 and, when no key in a bank associated with a particular rack is depressed, the bail will locate the zero block in a position directly in front of one of the shoulders 44 of the rack, thereby preventing substantial forward movement of the rack during a subsequent cycle of the machine. However, when any amount key is depressed and latched down, its bail 46 will be held outwardly sufficiently to maintain its zero block out of the path of the aligned rack.

The machine is driven by an electric motor diagrammatically indicated at 50 (FIG. 23) through a cyclic clutch 51 (FIG. 21), the driven side of which is connected to a rotatable drive shaft 52. The clutch is effective to cause a complete rotation of the shaft 52 during each cycle of operation.

The machine is controlled to perform different calculations by depressing various control bars, i.e. add bar 33, total bar 35, subtotal bar 97, non-add bar 98 and subtract bar 100. For this purpose, the stem of the add bar 33 is slideably mounted in aligned slots in the key frame plates 42 and 43 (as shown in FIG. 2) and is coupled through a pin and slot connection 53 with an arm 54 secured to a rock shaft 55. The latter shaft is effective upon rocking thereof to yieldably advance a clutch control bar 56 (FIG. 4) to effect engagement of the clutch 51. For this purpose, a lever 58 (FIG. 4) is secured to the shaft 55 and is yieldably connected through a tension spring 57 to a lever 58a free on said shaft. An ear 59 on the lever 58a normally rests against a portion of a lever 58, thereby causing the lever and arm to normally move together as a unit. A roller 60 on the lever 58a engages a camming surface formed on the clutch control bar 56 whereby to move the latter to the left upon depression of the add bar.

The clutch control bar 56 (see also FIG. 21) is connected through a hook 61 to a clutch control dog 62. When the bar 56 is moved to the left, the clutch control dog 62 is rocked counterclockwise to enable engagement of the clutch 51, the clutch dog 62 is also effective to rock a switch control lever 63 against the action of a spring 64 to effect closing of a double pole motor switch 65 (see also FIG. 23).

The total bar 35 (FIGS. 9 and 21) is also slideably mounted in slots formed in the key plates 42 and 43 and overlies a pin 93 carried on an arm 94 pivotally supported at 95. The pin 93 overlies a camming slot 96 formed in the clutch control bar 56 so that when the bar is depressed, the pin 93 will be effective to cam the clutch control bar 56 forward to cause engagement of the clutch.

Figure 9:
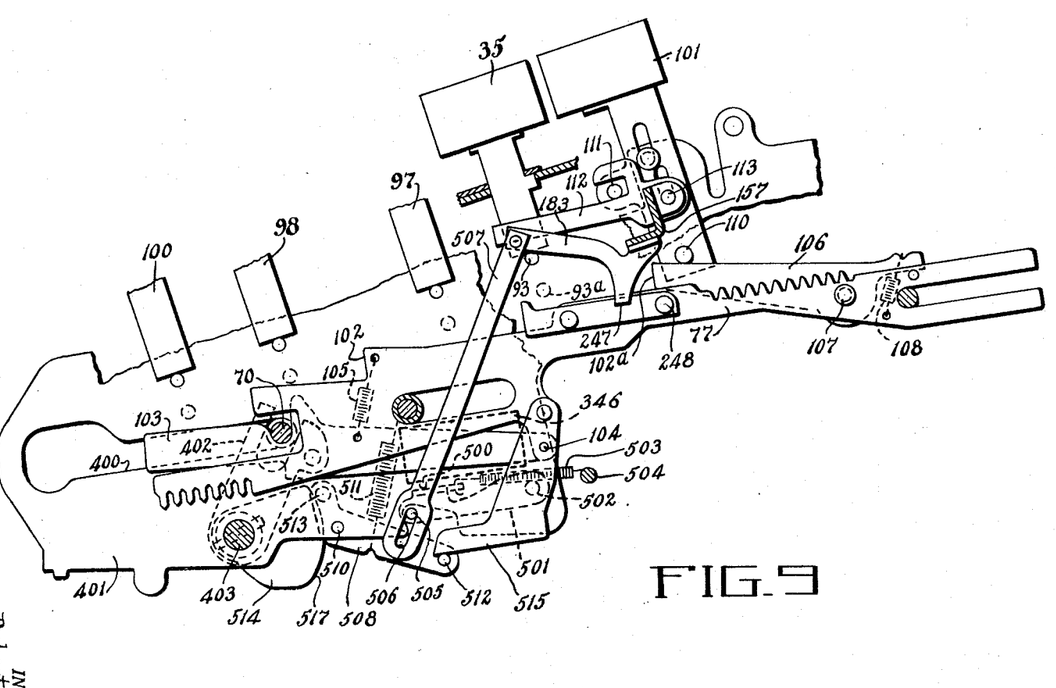
FIG. 9 is a sectional view illustrating part of the symbol printing controls and punch controls associated with the total and error control bars.

Means are provided for yieldably advancing the various racks 11 toward the left during the first part of the machine cycle and for returning the same to their illustrated home positions during the latter part of the cycle. The racks are provided with slots 67 and 68 which are slideably guided over rack support shafts 70 and 71, respectively. The shaft 70 is slideably mounted in guide slots 400 formed in machine side frames 401, one of which is shown in FIG. 9. The opposite ends of shaft 70 are embraced by bifurcated arms, one of which is shown at 402, suitably secured to a rock shaft 403. Means (not shown) operable by the drive shaft 52 are provided to rock the shaft 403 once during each cycle thereof to thus reciprocate the shaft 70.

In order to yieldably advance the various racks, each rack has opposed notches 72 located at the closed end of its slots 67, the notches being normally engaged by rollers 73 carried by pawls 74 pivotally mounted on the shaft 70. A spring 75 urges each pair of pawls in opposite directions whereby to hold the rollers 73 in driving engagement with the notches 72. However, during advancement of the racks, and when one thereof engages a zero block 48 or a depressed one of the keys 40, the rollers 73 will ride out of the notches 72 and along the edges of the slot 67 in that rack.

The printer 30 (FIG. 2) comprises a series of numeral printing wheels 76, each operatively entrained with a respective one of the racks 11. Each printer wheel, except that one associated with the rack underlying the clerk identification row of keys 14, and a special symbol printer wheel, has a series of type characters spaced therearound and ranging in value from "0" to "9." The special symbol printer wheel (not shown) associated and entrained with a symbol rack 77 (FIG. 9) is provided with a series of type therearound indicative of the type of operation performed by the machine.

Each printer wheel is rotatably mounted on an individual arm 78 loosely keyed on a printer control shaft 80 and spring urged clockwise by a tension spring 81. A gear 82, integral with each printer wheel, is maintained in continual mesh with a gear 83 also carried by the respective arm 78.

Except during printing operations, the levers 78 are held in their illustrated positions by the shaft 80 wherein the gears 83 mesh with associated idler gears 84 rotatably mounted on a fixed shaft 85. The latter idler gears are held in continual mesh with offset rack sections 86 carried by the various racks 11.

During a mid-portion of the cycle, and after the various racks 11 have been advanced to different positions limited by the keys 40, the shaft 80 is rocked clockwise, allowing the springs 81 to likewise rock the arms 78, if otherwise allowed to do so, causing the printer wheels 76 to move into printing contact with a printing ribbon 87 and the paper tape 22 as the latter passes around the rotatable platen 23.

The accumulator 27 (FIG. 2) comprises a series of accumulator gears 88 rotatably mounted on an accumulator shaft 89 and associated with racks controlled by the right hand section 12 only of the keyboard. Normally, the gears are located out of mesh with upper and lower rack sections 90 and 91 formed on the various racks. During additive entry operations of the machine, the accumulator is raised to mesh the accumulator gears with the rack sections 90 prior to forward advancement of the racks and is returned to its illustrated normal or home position to disengage the gears at the mid-portion of the cycle and after the racks have been advanced. During subtractive entries and totaling operations the accumulator is lowered into mesh with the rack sections 91 prior to advancement of the racks and is thereafter returned to neutral before return of the racks from advanced positions.

Means are provided to control the symbol rack 77 to print a symbol indicative of the type of operation performed by the machine. When any of the control bars 35, 97, 98 and 100 is depressed, it will likewise depress a pin, similar to pin 93 and similarly supported, to lower the same to a position, like that shown by the dot-dash lines 93a, lying in the path of an associated shoulder like 102 formed on the symbol rack 77.

The symbol rack 77 is supported in a manner similar to the aforementioned racks 11 and is yieldably connected to the rack drive shaft 70. For this purpose, a detent pawl 103 is pivoted to the rack at 104 and is spring urged upwardly by a spring 105 to normally maintain a detent notch therein in embracement with the drive shaft 70. Thus, the rack is moved forwardly by the shaft 70 until one of its stop shoulders 102 engages a depressed pin like 93, at which time the detent pawl will yield, thereby positioning the rack to set the aforementioned symbol printer wheel in position to print a symbol indicative of the type of operation being performed by the machine.

The stop shoulder 102a of the symbol rack which cooperates with the pin 93 associated with the total bar 35 is formed on a lever 106 pivotally mounted on the symbol rack at 107 and urged by a spring 108 into its normal illustrated position where it may be effective to engage the pin 93 when said pin is in the lowered position of 93a.

The error key 101, upon depression, is effective to depress the pin 93 for the purpose of effecting a totaling operation in a manner similar to that effected by the total bar. For this purpose, the error key stem is connected through a pin and slot coupling 111 to a lever 112 pivotally supported at 113. One end of the lever 112 overlies the pin 93. Thus, the error key, upon depression, is effective to rock the lever 112 to effect a totaling operation of the accumulator, among other things as will appear hereinafter. When the error key is depressed, a stud 110 thereon engages the lever 106, lowering the same to a position wherein the shoulder 102a will pass beneath the now lowered pin 93, allowing the symbol rack to be advanced to an error symbol indicating and printing position.

The symbol rack 77 is also provided with an auxiliary rack and brush (not shown) like the hereinafter described rack 261 and brush 263.

Describing now the construction of the form printer 20 (FIGS. 1 and 5 to 8), the latter is mounted on a U-shaped bracket 125, the sides of which are suitably secured to a part of amount printer frame shown partly at 126.

A cross piece 127 of the bracket yieldably supports a slide carrier 128. The latter supports a slide 130 for movement laterally of the machine into either of two positions. Headed studs 131 extend downwardly from the carrier 128 and are slideably mounted in bearing holes formed in the cross piece 127. Leaf springs 132 are secured to the cross piece 127 by screws 133 and engage respective pairs of the studs 131 at their outer ends whereby to hold the heads of such studs against the lower surface of the cross piece and thus maintain the carrier and slide 130 in a slightly raised position.

Flexible metal strips 134 and 135 are provided on opposite sides of the slide and are secured to the upper surface of the slide holder by screws, i.e. 136 (FIG. 8), located to one side of the path of the paper tape 22. It will be noted that the strips normally extend a slight distance from the upper surface of the carrier to permit a paper form 137 to be slipped therebetween. Also, the metal strips 134 and 135 have embossed thereon characters effective to print the titles 23 and 24 (FIG. 19) on the tape 22 which is guided over the slide 130 and strips 134 and 135 after passing over the platen 23.

A printing head or roller support 138 is located above the slide 130 and carrier 128, and is pivotally connected by studs 140 to upward extending portions of the sides of the form printer bracket 125. The roller support has downwardly extending side flanges 141, each having long slots 139 and relatively shorter slots 142 therein provided to guide axles 143 and 144 of printer rollers 145 and 146, respectively.

The rollers are formed of porous material impregnated with a fluid ink and are effective, when rolled in contact over the surface of the tape 22 to imprint thereon an image of the characters embossed on the strips 134 and 135 as well as an image of the customer's token 26 when such is mounted on the slide 130 and positioned in the path of the rollers.

The opposite ends of the axle 143 are connected to links 145a having studs 140a extending therefrom and embraced by slots formed in the opposite side arms of an actuator bail 147. The latter is pivoted at 148 to the sides of the printer bracket 125 and is connected at 149 to the upper end of an actuator link 149a. The ends of the axle 144 are embraced by slots 150 formed in the links 145a. Springs 159 extending between the axles 143 and 144 normally hold the roller 144 in its rearmost position, as illustrated, wherein the axle 144 engages the rear ends of the slots 142.

The printing head 138 has an opening 153 therein through which the tape 22 is deflected by a deflector plate 154 suitably attached to the slide carrier 128. An edge of the printing head, defining the opening 153, is serrated at 155 to facilitate tearing the tape at the conclusion of a sales transaction.

The link 149a is reciprocated once during a form print cycle only and for this purpose is arranged to be operated by an eccentric 151 keyed on the drive shaft 52. The link terminates in a bifurcated section slideable over a sleeve 152 mounted on the drive shaft. A transversely extending slot 153 formed in the link embraces a stud 154 carried on an arm 155 which is pivoted to a depending arm 156 secured to a form print control bail 157. The bail extends across the machine and is pivotally supported at 158 on opposite ends by the machine frame.

The control bail 157 is rocked counterclockwise upon a depression of the form print bar 18, as will appear later, and in doing so will be effective to position the pin 154 within a shorter slot 160 formed in an actuator slide 161 lying in juxtaposition with the link 149a. The slide 161 has a slot 162 therein also guided over the sleeve 152. A tab 163 struck out from the slot 162 and extending from the member 161 is guided in the bifurcated extension of the link 149a, to prevent rotation of the member 161.

Rollers 164 and 165 on the slide 161 extend in rolling engagement with the eccentric 151 and are thus effective to reciprocate the slide once during every cycle of the machine. The extent of this reciprocation is effective to cause the bail 147 and links 145a to move the printing rollers 145 and 146 along the lengths of their slots 139 and 142, respectively, and thus transfer an imprint of the type characters carried by the token 26 and strips 134 and 135 onto the tape 22.

It will be noted that the roller 146 is moved a shorter distance than the roller 145 since the latter will advance an appreciable distance in the slots 139 before the right hand ends of the slots 150 in the links 145a will pick up the axle 144 of roller 146 to advance the same. This arrangement enables the roller 145 to roll over both the strip 134 and the token 26 while the roller 146 rolls over the strip 135 only.

The rollers 146 and 145 are normally located a slight distance above the substantially coextensive surfaces of the token 26 and strips 134 and 135 to permit the tape 22 to freely pass therebetween when the latter is advanced. However, means are provided for lowering the printing head 138 about the pivot studs 140 at the start of a form print operation so as to effect an intimate rolling contact of the rollers 145 and 146 against the tape 22 which is thereby pressed against the type characters by the strips 135 and 136 and the token 26. For this purpose, a bail 170 is extended over the printing head, having its side arms pivoted thereto by studs 171. The lower ends of the bail arms project under ears 172 formed in levers 173 which are pivotally supported at 174 on the bracket 125 and have rollers 175 thereon embraced by camming slots 176 formed in the arms of the bail 147. During the initial counterclockwise rocking movement of the bail 147, the levers 173 are cammed downwardly to likewise draw the bail 170 and printing head 138 downwardly by the studs 171.

When the bail 147 is again rocked clockwise to its illustrated home position, the bail 170 and printing head 138 will be counter balanced by the springs 177 to their illustrated home positions.

In the event it is desired to gain access to the interior of the form printer, as, for example, to write on the upper surface of the tape 22, the bail may be rocked clockwise against the action of springs 177 until the lower projecting ends of the bail arm 170 are removed from under the ears 172, and thereafter the springs 177 will cause the printing head to be swung rearward about the pivot support studs 140, the studs 140a swinging free from the slots in the bail 147.

When the rollers 145 and 146 are returned to their original positions, the spring 177 is effective to again raise the printing head slightly, permitting the tape 22 to be fed forwardly any desired amount. This may also be accomplished manually by a knob 167 (FIG. 1) which extends through an opening 168 in the cover 254 of the machine and is attached to the paper support platen 23.

Figures 7, 8:
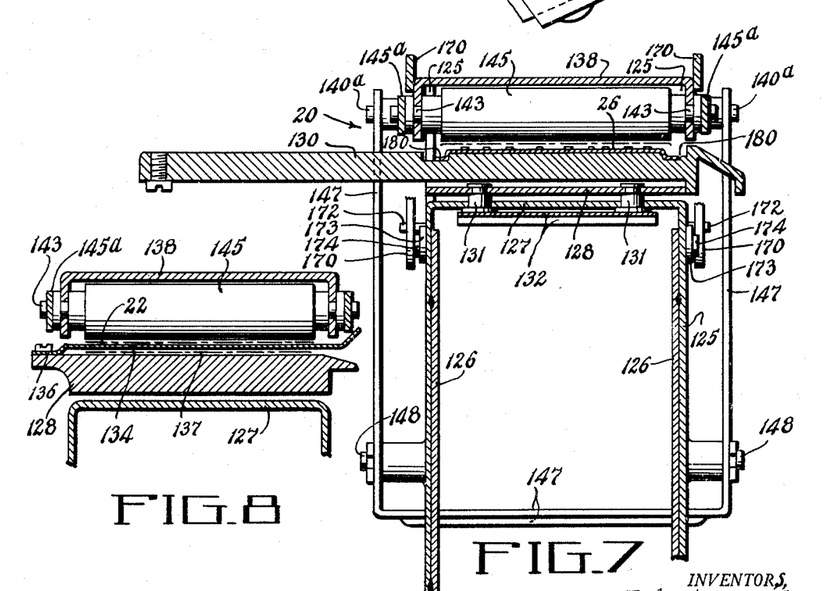
FIG. 7 is a transverse sectional view through a portion of the form printer and is taken along line 7—7 of FIG. 5.
FIG. 8 is a transverse sectional view taken along the line 8—8 of FIG. 5.

In order to insert a customer's token 26 in position to obtain an imprint thereof on the tape 22 during the form print operation, the slide 130 is moved to the right in FIG. 7 to a position where the token may be fitted in suitably shaped grooves 180 formed in the slide. Thereafter, the slide is returned to the left, aligning the token with the path of movement of the rollers 145.

It is frequently desirable to obtain an imprint of the customer's token, i.e. 26, on an additional slip such as a merchandise handling form or the like as indicated at 137. For this purpose the form 137 is slipped under the strips 134 and 135 so that an imprint of the characters on these strips will not be transferred to the form. The under surface of the tape 22 may be provided with a carbon or chemically active transfer coating so that an image of the characters on the token will be imprinted on the top surfaces of both the tape 22 and the form 137, at the same time.

This undercoating of the paper tape 22 also makes possible a transfer of the machine printer characters to a second tape 22a which underlies the tape 22 in juxtaposition to the roller 23 and which is rewound within the machine upon a take-up roll 189.

The above described form printer is disclosed and claimed in the co-pending application of Boyden et al., S.N. 742,081, filed on June 16, 1958, now Patent No. 2,916,989, for "Printing Apparatus."

Figure 21:
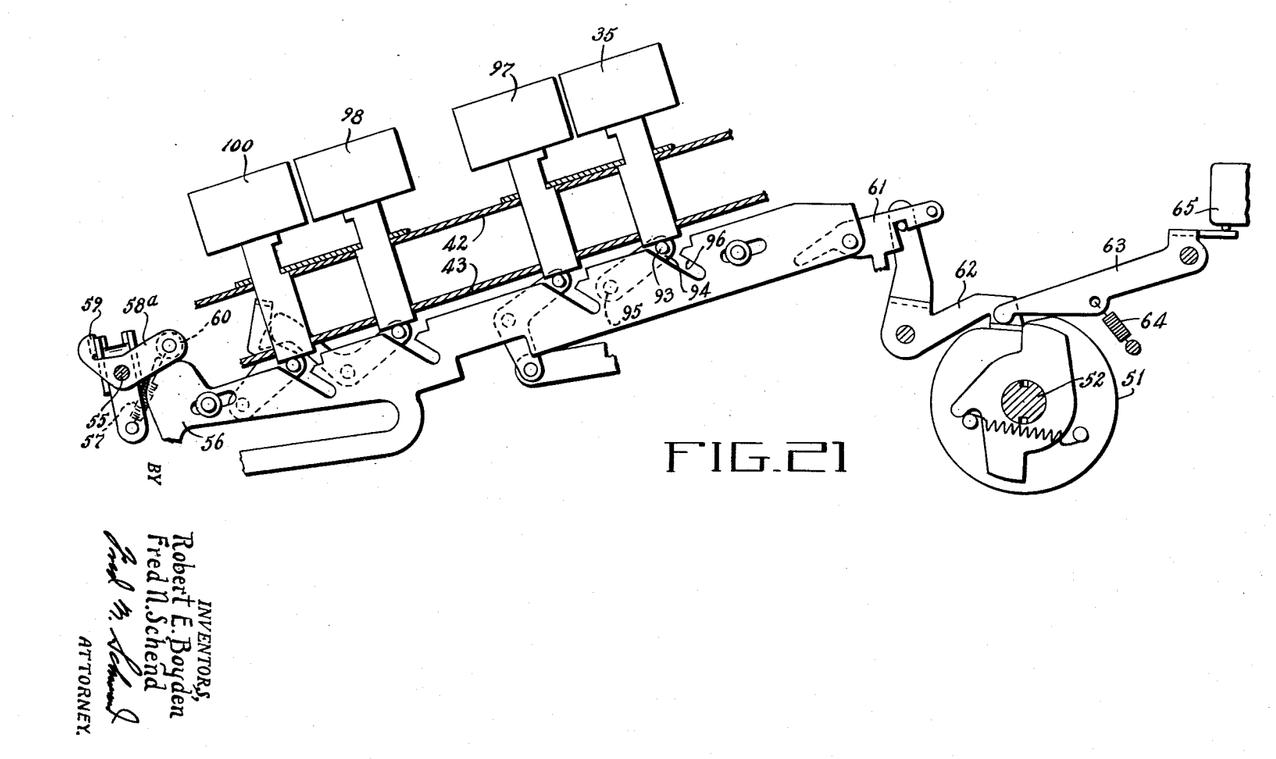
FIG. 21 is a sectional view illustrating the clutch controls.

Describing now the form print controls, the form print bar 18 (FIGS. 1, 10 and 11) has its key stem slideably supported in aligned slots formed in the key support plates 42 and 43 and overlies a pin 181 carried by an arm (not shown) pivotally supported in a manner similar to arm 94 (FIG. 21). The pin 181 overlies an extension 182 of the form print control bail 157.

The bail 157 has a forwardly extending arm 183 (FIG. 9) thereon which overlies the forementioned total key operated pin 93. Thus, when the form print bar 18 is depressed, rocking the control bail 157 counterclockwise, the pin 93 will be lowered to initiate a totaling operation whereby to clear the accumulator. At this time, the various racks 11 will advance to set the printer to print the department number, clerk number and merchandise code as set up on the left hand section of the keyboard. However, although the accumulator is cleared at this time, means are provided to prevent printing of the right hand amount section of the printer associated with the accumulator. For this purpose, a slide 185 is provided. The latter is bifurcated at its upper end to slideably embrace a guide rod 186. The lower end of the slide 185 has an elongated slot 187 thereon which embraces screws 187a set in an actuator slide 188. A leg 190 on slide 185 and a leg 191 on the slide 188 straddle the drive shaft 52 and thus, together with the rod 186, guide the slides 185 and 188 for vertical movement. A roller 192 on the member 188 is held in rolling engagement with a cam 193, keyed on shaft 52, by a tension spring 194.

When the form print control bail 157 is rocked by depression of bar 18 to initiate a form print operation, an arm 195 thereon moves a link 196 pivotally connected thereto to position a pin 197 within coextensive slots 198 formed in both the slide 185 and the slide 188. Thus, as the cam 193 is rotated by the shaft 52, both the slide 188 and the slide 185 will be raised as a unit against the action of springs 194 and 200 to locate an ear 201 at the upper end of the slide 185 in blocking relation with tails formed on the printer arms 78, associated with the keyboard group 12, from moving into printing contact with the paper tape 22.

Means are provided for enforcing depression of keys in both the clerk row 14 and the merchandise code or transaction row 16 previous to a form print operation. For this purpose, the lock bails 46 associated with the rows 14 and 16 each have a foot, like foot 202 (FIGS. 12 and 13) secured thereto. Normally, when all keys in such a row are in raised position, the foot extends in latching relation with an extension, like 203, suitably attached to the bail 157. When a key in a respective row is depressed, however, the locking bail 46 in such row moves the associated foot 202 out of latching relation with the extension 203, permitting the bail 157 to be rocked if otherwise allowed to do so.

Figure 14:
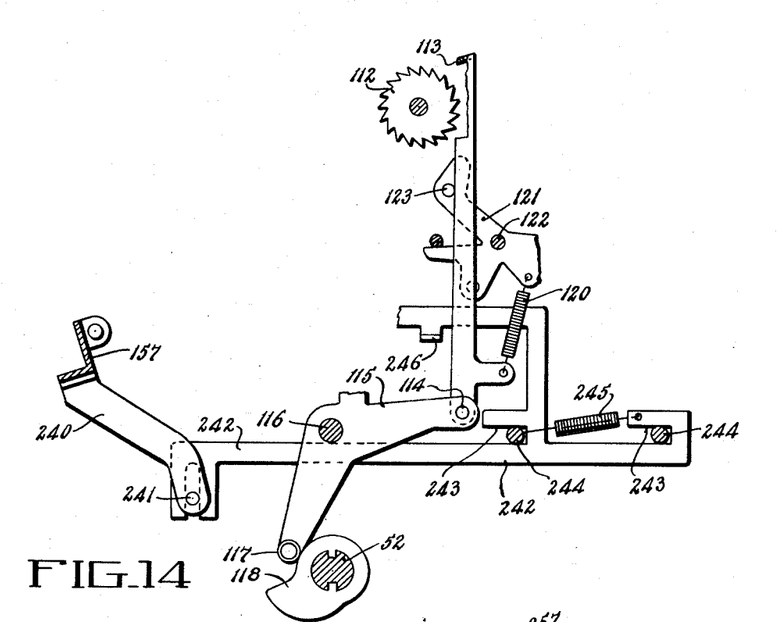
FIG. 14 is a sectional view illustrating part of the paper feed controls.

The paper tape 22 is normally advanced one increment toward the end of each machine cycle and for this purpose the paper supporting platen 23 (FIG. 2) has secured thereto a ratchet 112 (FIG. 14) arranged to be engaged and advanced by a pawl 113. The latter is pivotally connected at 114 on a cam follower 115 pivotally supported at 116. A roller 117 on the lower end of the cam follower engages a cam 118 keyed on the drive shaft 52. A tension spring 120 extending between the pawl 113 and a lever 121, which is pivotally supported at 122, normally holds the pawl 113 against a pin 123 on the lever 121 and in a position to engage the ratchet 112 and advance the platen one increment.

Means are provided to prevent automatic spacing of the paper tape as an incident to a form printing operation. For this purpose, an arm 240 (FIG. 14) on the form print control bail 157 is connected through a pin and slot coupling 241 with a slide element 242. The latter is provided with slots 243 guided on fixed frame pins 244 and normally urged to the left by a spring 245 tensioned between the slide and one of the frame pins. The slide 242 has an ear 246 thereon which, when the bail 157 is rocked to initiate a form print operation, engages the pawl 113 to rock the same into a path wherein it will be ineffective to engage and advance the paper feeding ratchet 112.

Means are also provided for preventing the symbol rack 77 (FIG. 9) from advancing from its home position during a form printing operation so that no symbol will be printed during such operation. A downwardly projecting extension 247 on the aforementioned arm 183 is normally located out of the path of a pin 248 fixed to the symbol rack. However, when the bail 157 is rocked counterclockwise to initiate a form print operation, the projection 247 will be swung downward and rearward until it engages the stud 248, thus blocking the symbol rack from advancement.

Figure 1:
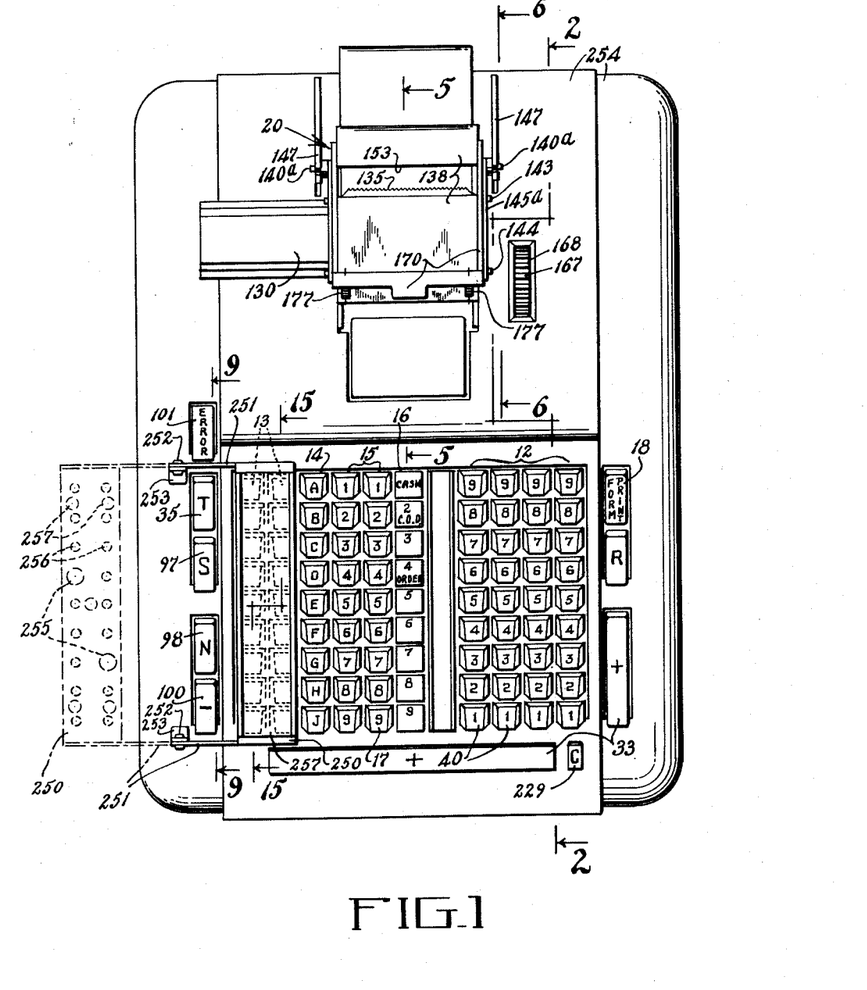
FIG. 1 is a plan view of a sales transaction machine embodying the present invention.
Figure 15:
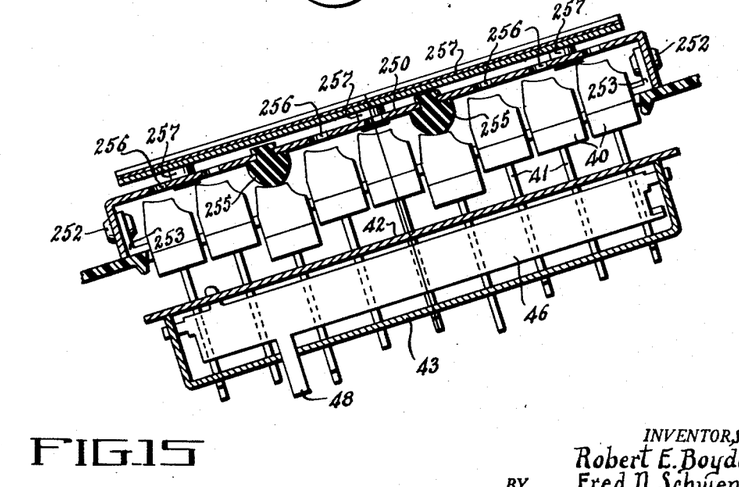
FIG. 15 is a longitudinal sectional view taken along the line 15—15 of FIG. 1 illustrating the swingable department identification key control plate.

Since a transactor machine of this nature is usually permanently installed in a certain department, the record of the department number is generally the same for all sales transactions. Therefore, means are provided to facilitate setting up the department number in the department number group 13 of the keyboard. Referring in particular to FIGS. 1 and 15, a plate 250 is provided having laterally extending arms 251 at opposite ends thereof which are pivoted at 252 to brackets 253 suitably secured to the machine cover 254. The plate 250 has a series of holes therein which when the plate is swung to its position shown in FIG. 15 lie in vertical alignment with the group 13 of department identification keys. Rubber buttons 255 are inserted in certain of the holes in alignment with the keys representing the department number so that, when the plate is swung toward the keys, those keys located under the buttons 255 will be depressed. The buttons 255 may be readily removed from any of the holes 256 and replaced in others to change the department number as desired.

An indicia bearing plate 257 is mounted over the plate 250 and is secured in slightly elevated relation thereto by studs 258.

Means are provided to clear the keyboard as an incident to different machine operations. For this purpose a key release bar 205 (FIG. 10) is provided. The latter has tabs 206 thereon which extend directly in front of the various key locking bails 46 which are effective, when the bar is moved to the right, to release all depressed keys in the keyboard.

Figures 10, 11, 12, 13:
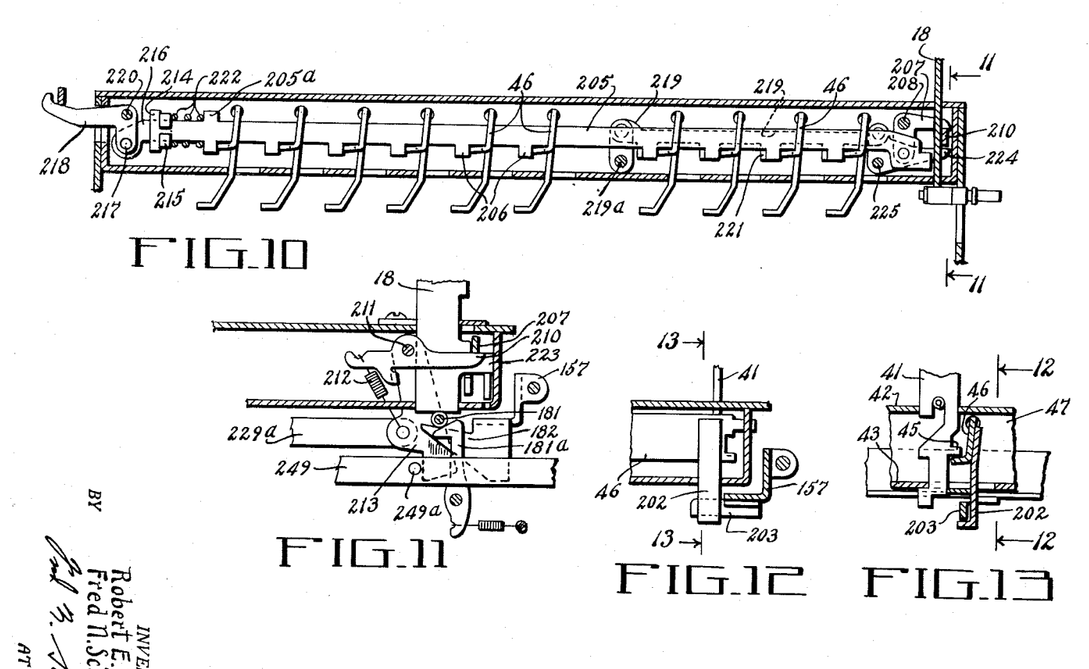
FIG. 10 is a transverse sectional view taken along line 10—10 of FIG. 2 illustrating part of the key release mechanism.
FIG. 11 is a sectional view taken along the line 11—11 of FIG. 10 illustrating some of the controls associated with the form print bar.
FIG. 12 is a fragmentary sectional view illustrating part of the enforced designation mechanism and is taken along the line 12—12 of FIG. 13.
FIG. 13 is a sectional view taken along the line 13—13 of FIG. 12.

The bar 205 is pivotally supported at its right hand end by a bellcrank 207, fulcrumed at 208, and having one arm overlying a yieldable arm 210 (see also FIG. 11). Th latter is pivotally supported at 211 and is yieldably connected by a spring 212 to a second lever 213 also pivoted at 211. Thus, when the lever 213 is swung counterclockwise, as by depression of a clear key 229 (FIG. 1), and consequent actuation of a link 229a (in a manner not shown) or a power driven key release bar 249, any depressed keys in the keyboard will be released.

The left hand end of the bar 205 terminates T-shaped at 214 and is slideably supported by bent over fingers 215 formed on a short member 216 which is pivotally connected at 217 to a bellcrank 218. The latter is fulcrumed at 220 and is rocked counterclockwise upon depression of the pins (like pin 93) associated with the total and subtotal bars described in the aforementioned Boyden patent. During a totaling operation, the bar 205 therefore is moved to the right at the initiation of such operation to release all depressed keys. Means, however, are provided for preventing a right handed motion of the bar 205 and consequent release of any amount keys in the left hand section of the keyboard during a form print operation initiated by depression of the form print bar 18 even though the pin 93 (see FIG. 9) is lowered to effect clearing of the accumulator at this time. For this purpose, a tab 223 (FIG. 11) on the key stem of the form print bar 18 is arranged to be lowered directly in front of the right hand end of the bar 205. Since the bellcrank 218 will be rocked at this time, a spring 222 coiled about the bar 205 between lugs 205a thereon and the fingers 215, will be compressed to take the thrust. However, during a normal total operation initiated by the bar 35 the tab 223 will not be lowered and the inherent resistance of the spring 222 will drive the bar 205 to the right to release all keys. In order, however, to release any depressed key in the right hand section 12 of the keyboard during the form print operation, the tab 223 of the form print bar 18, while blocking the bar 205, will also be effective to rock a bellcrank 224 fulcrumed at 225 and supporting the left hand end of a second key release bar 219 which has tabs 221 thereon engageable with the lock bails 46 of the various keys located in the right hand key section 12 only. The left hand end of the bar 219 is supported by a swinging arm 219a. Thus, when the form print bar 18 is depressed, the release bar 221 only will be moved to the right. The pin 181, when depressed by the bar 18, will be held down by a latch 181a until released by a pin 249a on the bar 249.

It will be recalled that during the entry of items, as indicated for example, in line 34 (FIG. 19), constituting a sales transaction, into the machine by depression of the add bar 33, the depression of an amount key in either of rows 16 and 17 is required before an add operation can occur. For this purpose, a slide element 226 (FIGS. 3 and 4) is slideably mounted on the front wall 47 of the key frame by screws 227 which extend through slots 228 in the slide. The latter has ears 230 thereon extending rearwardly to positions lying directly behind the lock bails 46 for the key rows 16 and 17. A blocking ear 231 is formed on the slide element 226. Normally, when no key in either of the rows 16 and 17 is depressed, a spring 229 holds the slide element in a position wherein the ear 231 lies directly below the aforementioned lever 58, thus preventing the shaft 55 from being rocked to initiate an add operation when the add bar is depressed. However, when a key in either of these rows is depressed, its associated locking bail 46 will be rocked counterclockwise sufficiently to force the slide member 226 into a position wherein its locking ear 231 will be removed from under the lever 58.

As mentioned heretofore, the tape punch unit 31 (FIG. 22) is controlled by the sales transaction machine in order to punch in coded form on the code tape 32 a record of the items printed on the paper tape 22 by the printer 30 (FIG. 2). For this purpose, the positions of the racks 11 when advanced to digitized positions are electrically sensed and the information thus obtained is utilized to accordingly control the punch unit 31.

Since the connection between the various racks and the punch unit is disclosed in detail and claimed in the copending application of R. E. Boyden, et al. S.N. 513,365, filed June 6, 1955, now matured into Patent 2,927,729, and the construction of the punch unit itself is described in detail in the Blodgett Patent No. 2,700,466, issued on January 25, 1955, reference will be had to said applications for a complete description of such apparatus.

Slideably mounted on pins 260, fixed to each of the racks 11, is an auxiliary rack 261. The latter is normally retained in its positions shown in FIG. 2 relative to its rack by a spring 262. A generally U-shaped brush 263 is supported from each auxiliary rack 261 by a brush carrier 264 of insulating material. Each of the brushes 263 is split to form a series of brush fingers 265 (FIG. 17) engageable with a contact plate assembly generally indicated at 266. The latter comprises two superimposed plates 267 and 268 of insulating material secured to the top surface of the plate carrier 270 (see also FIGS. 16 and 18).

Bonded to the upper surface of the plate 267 are denominationally arranged feeder strips 271 arranged to be engaged by certain of the brush fingers 265. The remaining brush fingers of the various brushes are aligned with slots 271 in the plate 267 and are movable over a series of transversely extending digital conductors 272 bonded to the top surface of the lower plate 268, each conductor representing one of the digits from "0" to "9."

Normally, when the machine is at rest, the contact plate assembly is held in a raised position, as shown in FIGS. 2, 16 and 17, wherein the brushes 263 bridge certain of the column feeder conductors 271 and certain of the digit conductors 272, depending upon the positions of the auxiliary racks. At this time an aligner 273 engages certain of a set of teeth 274 formed on the auxiliary racks 261 to maintain the same in the positions to which they were previously adjusted by the main racks 11.

At the start of a machine cycle, the contact plate assembly is lowered and held there until the main racks have advanced the auxiliary racks 266 to newly digitized position. At that time, the contact assembly is again raised, to form new bridging connections between the strips 271 and the digit conductors 272.

For this purpose, the contact plate assembly carrier 270 is provided with end flanges, one of which is shown at 270a (FIG. 16) having guide slots 275 thereon slideably engaging fixed frame pins 276. Each flange 270a is connected through pin and slot connections 277 to levers 278 pivoted on the pins 276 and pivotally connected together through a pin and slot connection 280. The end flanges 270a are also connected through pin and slot connections 281 to bellcranks 282 fastened on the opposite ends of a rock shaft 283. One of these bellcranks 282 is connected through a link 284 to a cam follower 285, fulcrumed at 286, and provided with a roller 287 engaging the periphery of a cam 288 keyed on the drive shaft 52.

When the machine is in its full cycle position, the parts are arranged as shown in FIG. 16, the cam 288 holding the contact plate assembly in its raised position. However, at the start of a cycle, the cam follower 287 will drop off the high portion of the cam 288, allowing a spring 290 to lower the contact plate assembly sufficiently to disengage the brushes 263 from strips 271 and conductors 272 and to disengage the aligner 273 from the teeth of the auxiliary racks. At approximately 180° in the cycle, the cam 288 will again raise the contact plate assembly.

Figure 23:
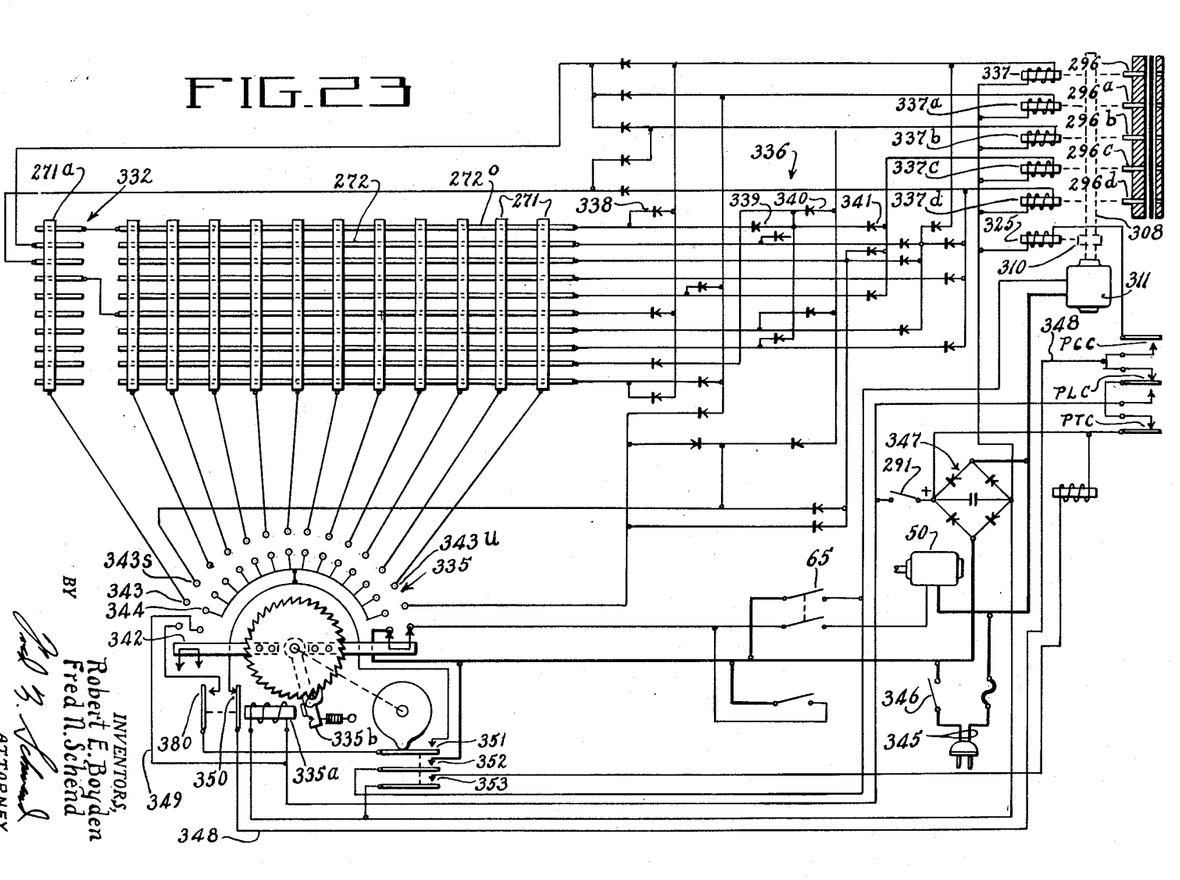
FIG. 23 is a circuit diagram illustrating the circuit connections for controlling the punch device.

The cam 288 is also effective to momentarily close a switch 291 (see also FIG. 23). For this purpose, the cam is provided with small lobe 292 which, when it engages the cam follower 287 at the 180° point in the cycle, rocks a switch lever 293 about a fulcrum pin 294 and against the action of a spring 295 to allow the switch 291 to momentarily close.

The punch unit 31 comprises a series of punches, one of which is shown at 296 (FIG. 22). The punches are slideably mounted in a guide block 297 and, during a punching operation, certain ones of the punches are moved upwardly to perforate the code tape 32 and to move into openings in a die block 298.

Each punch is pivotally connected at 300 to a floating lever 301 pivoted on a rod 302. The latter is carried at opposite ends thereof by cam followers, one of which is shown at 303, fulcrumed at 304 and urged downwardly by a spring 305 to hold rollers 306 against the peripheries of cams 307 suitably fixed to a shaft 308 driven by a punch motor 311 (see FIG. 23).

The left hand end of each of the floating levers 301 is normally free to swing up and down, the right hand end thereof being normally held in a lowered position by a spring 312.

A series of latch levers 313, one for each of the floating levers 301, are independently pivoted on a fixed shaft 314 and are normally held in their illustrated positions against the action of springs 315 by respective latch armatures 316 pivotally supported at 317 and 318 by a magnet frame 320. Electromagnets 321 are mounted on the frame 320 and each is effective, when energized, to raise its respective armature 316 against the action of a spring 322. This action releases an associated latch lever 313, permitting the latter to position a latching shoulder 313a thereon over the left hand end of an aligned one of the floating levers 301. During an ensuing punch cycle, the lever 301 will now fulcrum about the latching shoulder 313a thereby raising its punch 296 to perforate the tape 32.

When any latch lever is tripped it forces a bail 323, also pivoted on shaft 314, clockwise causing an arm 324 thereof to close a set of contacts PCC located in circuit with an electromagnet 325 (FIG. 23) which is effective to cause engagement of the punch operating clutch 310.

At the start of each punch cycle and before appreciable movement of the levers 301, the latch levers 313 are locked in either tripped or untripped positions. A latch lock bail 326 is pivotally mounted at 327 and is provided with a roller 328 urged by the spring 305 against the periphery of a cam 329 fixed to the shaft 308. A hook portion 330 of the bail 326 is effective to engage spear shaped heads 331 formed on the latch levers 313 to locate the same in whichever positions they have been previously set. The bail 326 is also effective to throw a switch PLC from one position to another and to return the same during the latter half of the cycle.

Describing now the circuit connections for controlling the punch unit 31, it should be first noted that a separate symbol information section 332 is provided on the contact plate assembly (FIGS. 9, 18 and 23) so that a symbol code may be punched in the tape to indicate the type of operation performed by the machine.

A stepping switch generally indicated at 335 is provided to successively pick off the digital information from the different racks 11 as well as the symbol information and to transmit such information through a diode matrix generally indicated at 336 to the various punches.

In the example shown, a five channel code is employed utilizing two punches 296 and 296d controlled by respective punch control magnets 337 to 337d.

The various digit conductors 272 are connected to the punch control magnets 337 etc., through different combinations of diodes in the matrix 336 to punch different numerical code patterns for the different digits from "0" to "9." For example, the "0" conductor 272° is connected through diodes 338, 339, 340 and 341 to the punch control magnets 337, 337b and 337d, respectively.

When the stepping switch is operated, the switch arm 342 thereof, successively bridges pairs of contacts located in two rows 343 and 344. Various contacts of the row 343, starting with contact 343u are connected to successively higher denomination feeder strips 271 while the next to the last contact in this row is connected to the symbol feeder strip 271a.

It will be noted that the lower pole (FIG. 23) of the main switch 65 is connected in series with the circuit for the motor 50 across an A.C. power supply 345. The upper pole of this main switch is connected in series with a circuit for the punch motor 311 also across the power supply 345.

When a master switch 346 in the power supply circuit is closed, as will be described hereinafter, depression of any of the machine control bars, i.e., add bar 33, will cause engagement of the main clutch 51, (FIG. 21) to advance the various racks 11 and will also close the main switch 65 causing the adding machine to cycle and the punch motor 311 to operate.

A full wave rectifier 347 is connected across the power supply circuit 345, the positive side of the rectifier being connected to the aforementioned switch 291 (see also FIG. 16) and through normally closed contacts PTC to the movable blade of the switch PLC. Thus, positive potential is normally applied through line 348 and normally closed interrupter contacts 350 (operable by the stepping switch magnet 335a) to all but the first and last contacts in the row 344.

At approximately 180° in the cycle of the machine, and as the contact plate assembly is raised to cause the brushes 263 (FIGS. 2 and 18) to bridge the denominational feeder strips 271 and different ones of digit conductors 272, the switch 291 momentarily closes to energize the stepping switch magnet 335a by connecting the same in circuit across the D.C. terminals of the rectifier 347. Although the stepping pawl 335b is actuated at this time, the latter is not effective to advance the switch arm 342 until the magnet 335a deenergizes.

As the switch 291 opens after a passage of the cam lobe 292 past the follower 285, the stepping pawl 335b is spring returned and at this time advances the switch arm 342 to its No. 1 position. A set of normally-off contacts 351, 352 and 353 are now closed. The contacts 352 are connected in parallel with the upper pole of the main switch 65 and are thus effective to hold the punch motor circuit completed until the punching operation is finished.

As the switch arm 342 reaches its No. 1 position, it completes a circuit through appropriate diodes of the matrix 336 to energize the punch magnets 337, 337a, 337c and 337d. The contacts PCC will now close to engage the punch clutch 310 and a "Figure" code will be punched on the tape indicating that the subsequently punched code patterns will represent figures. During this punch cycle the switch PLC will be thrown to its alternate lower position, again (through line 348) momentarily energizing the step which magnet 335a to step the switch arm 342 to its No. 2 position wherein it completes a circuit through the contact 343u to the units feeder strips 271 so as to control the appropriate punch or combination of punches representing the numerical position to which the rack 11 in the units denomination of the machine has been advanced.

This series of events will be repeated until the complete field has been scanned and in its last position before reaching home, the stepping switch arm 342 will complete a circuit from the positive side of the rectifier 347, through contact PLC, line 348, contacts 350, now close contacts 351, contacts 380, switch arm 342, line 349, and the step switch magnet 335a to the negative side of the rectifier to finally advance the switch to its illustrated home position. Here the off-normal contacts 351 to 353 are opened to terminate the punch operation.

As the switch arm 342 reaches the contact 343s a code pattern representing "symbols" will be punched indicating that the subsequently punched code pattern will represent a symbol. The switch arm will then advance to the symbol column position to complete a circuit through the symbol order feeder strip 271a, through the symbol rack brush and the appropriate diode combination to the appropriate punch selecting magnet.

As described hereinbefore, means are provided to normally disable the punch unit, leaving the machine to operate as an adding listing machine and to automatically enable the punch unit when the machine is employed to record a sales transaction.

Referring to FIGS. 9 and 23, in particular, the master switch 346 is suitably secured (in a manner not shown) to the machine frame in juxtaposition to the symbol rack 77, and is of the normally closed type. The plunger 500 of the switch is engageable by an arm 501 pivotally supported at 502 and connected to an overcenter spring 503 fastened to a frame stud 504. The spring 503 is effective to hold the arm in its position shown wherein it is effective to maintain the switch 346 open or in an alternatively rocked position wherein the switch becomes closed.

The arm 501 is provided with a pin 505 embraced by a slot 506 formed in the lower end of a link 507 which is pivotally connected at its upper end to aforementioned arm 183 of the bail 157. When the form print bar 18 (FIG. 1) is depressed to initiate a form print operation precedent to a sales transaction, the bail 157 will be rocked counterclockwise causing the link 507 to rock the arm 501 downwardly, thus causing the master switch 346 to close. The overcenter spring 503 will thereafter hold the arm 501 in a lowered position wherein the pin 505 will engage the lower end of the slot 506.

A retracting lever 508 is pivotally supported at 510 and urged upwardly by a tension spring 511 tending to force a pin 512 thereon against the arm 501 to return the same to switch opening position.

A pin 513 on the lever 508 normally rides on the periphery of a control cam 514 fixed to the aforementioned rack drive shaft 403. Also, the pin 512 normally underlies a blocking surface formed on a piece 515 integrally secured to the symbol rack 77.

Toward the mid-point in a machine cycle, and after the various racks 11 and the symbol rack 77 have been advanced to digitized positions, a dwell portion 517 on the cam 514 will pass from under the pin 513, permitting the spring 511, as otherwise allowed to do so, to swing the lever 508 upwardly, forcing the arm 501 against the plunger 500 to open the switch 346. However, in all operations other than a totaling and error operation as initiated by the control bar 35 and 101, respectively, the lever 508 will be prevented from so blocking by the piece 515. In totaling and error operations the blocking portion of the piece 515 will advance to the left in FIG. 9, past the pin 512 so that the lever 508 will then become effective to open the switch 346.

Having thus described the invention what we desire to secure by United States Letters Patent is:

1. In a sales transaction machine, an accumulator, differential actuators therefor, means for differentially controlling said actuators, an amount printer operably associated with said actuators for printing amounts registered by said actuators across a record field of a record medium, means for yieldably operating said actuators, a form printer for printing a form across said record field of said record medium, means for guiding said record medium seriatim through said printers, means including a depressible key for causing operation of said operating means and said amount printer; and means including a second depressible key for causing operation of said operating means and said form printer.

2. In a sales transaction machine, an accumulator, differential actuators therefor, means for differentially controlling said actuators, a normally enabled amount printer operatively associated with said actuators for printing amounts registered by said actuators across a record field of a record medium, means for yieldably operating said actuators, a normally disabled form printer for printing a form across said record field of said record medium, means for guiding said record medium seriatim through said printer, means including a depressible key for causing operation of said operating means; and means including a second depressible key for causing operation of said operating means, said last mentioned means being effective to disable said amount printer and to enable said form printer.

3. In a sales transaction machine, an accumulator, differential actuators therefor, means for differentially controlling said actuators, a normally enabled amount printer operatively associated with said actuators for printing amounts registered by said actuators across a record field of a record medium, means for yieldably operating said actuators, a normally disabled form printer for printing a form across said record field of said record medium, means for guiding said record medium seriatim through said printers, means including a depressible key for causing operation of said operating mechanism to take a total from said accumulator; and means including a second depressible key for causing operation of said operating means to take a total from said accumulator, said last mentioned means being effective to disable said amount printer and to enable said form printer.

4. In a sales transaction machine, an accumulator, differential actuators therefor, means for differentially controlling said actuators, a normally disabled recording device controlled by said actuators for recording amounts entered in said accumulator by said actuators, means including a depressible key for causing said actuators to clear said accumulator; said last mentioned means being effective to enable said recording device, a printer controlled by said actuators, means including a second depressible key for causing said actuators to take a total from said accumulator and to effect operation of said printer, and means controlled by said last mentioned means for disabling said recording device after said total is printed.

5. In a sales transaction machine, a printer, differential actuators therefor, a plurality of depressible keys for differentially controlling said actuators, motor driven means for operating said actuators, means responsive to operation of said operating means for normally releasing said keys from depressed position, means including a plurality of depressible control keys for causing operation of said operating means; and means controlled by one of said depressible control keys upon depression thereof for preventing said releasing means from releasing certain only of said first mentioned keys.

6. In a sales transaction machine, differential actuators, means for differentially controlling said actuators, means for operating said actuators, a normally disabled recording device controlled by said actuators for recording amounts registered by said actuators, means including a plurality of independently depressible keys for causing operation of said operating means; means controlled by one of said keys upon depression thereof for enabling said recording means, means responsive to operation of said operating means tending to disable said recording means, and a device controlled by certain only of said keys upon depression thereof for preventing operation of said last mentioned means.

7. In a sales transaction machine, an accumulator, differential actuators therefor, means for differentially controlling said actuators, an amount printer operatively associated with said actuators for printing amounts registered by said actuators across a record field of a record medium, means for yieldably operating said actuators, a form printer for printing a form across said record field of said record medium, means for guiding said record medium seriatim through said printers, means including a depressible key for causing operation of said operating means and said amount printer; and control means including a second depressible key for causing operation of said operating means and said form printer, said control means comprising means for causing said actuators to clear said accumulator.

8. In a sales transaction machine, an accumulator, differential actuators therefor, means for differentially controlling said actuators, an amount printer operatively associated with said actuators for printing amounts registered by said actuators across a record field of a record medium, means for yieldably operating said actuators, a form printer for printing a form across said record field of said record medium, means normally operable as an incident to operation of said operating means for feeding said record medium seriatim through said printers, means including a depressible key for causing operation of said operating means and said amount printer; and control means including a second depressible key for causing operation of said operating means and said form printer, said control means comprising means for causing said actuators to clear said accumulator, and means for rendering said feeding means ineffective.

References Cited in the file of this patent

UNITED STATES PATENTS

| | | |
|---|---|---|
| 1,131,620 | Swalm | Mar. 9, 1915 |
| 1,306,606 | Monroe | June 10, 1919 |
| 1,608,145 | Tingley | Nov. 23, 1926 |
| 2,010,068 | Duke | Aug. 6, 1935 |
| 2,167,715 | Green | Aug. 1, 1939 |
| 2,176,371 | Wahl | Oct. 17, 1939 |
| 2,228,165 | Haegele et al. | Jan. 7, 1941 |
| 2,422,103 | Lambert | June 10, 1947 |
| 2,472,696 | Drake | June 7, 1949 |
| 2,583,810 | Boyden | Jan. 29, 1952 |
| 2,598,161 | Gruver | May 27, 1952 |
| 2,636,435 | Goodbar et al. | Apr. 28, 1953 |
| 2,730,039 | Werner | Jan. 10, 1956 |
| 2,738,128 | Bilde | Mar. 13, 1956 |
| 2,868,445 | Chall et al. | Jan. 13, 1959 |